United States Patent
Fekete et al.

[15] 3,674,727
[45] July 4, 1972

[54] UNSATURATED POLYESTERS

[72] Inventors: Frank Fekete, 4403 McKenzie Drive, Monroeville, Pa. 15146; John S. McNally, 457 Glenview Drive, Lower Burrell, Pa. 15068

[22] Filed: Oct. 20, 1970

[21] Appl. No.: 82,544

[52] U.S. Cl. .................260/22 D, 260/22 CB, 260/75 UA, 260/75 A, 260/861, 260/869, 260/871
[51] Int. Cl. .........................C08f 21/02, C08g 17/12
[58] Field of Search ..................260/861, 75 U, 22 D

[56] References Cited

UNITED STATES PATENTS

| | | | |
|---|---|---|---|
| 3,530,202 | 9/1970 | Fekete et al. | 260/861 |
| 3,533,999 | 10/1970 | Fekete et al. | 260/75 |
| 3,560,445 | 2/1971 | Fekete et al. | 260/75 |

FOREIGN PATENTS OR APPLICATIONS

| | | |
|---|---|---|
| 1,047,483 | 11/1966 | Great Britain |

OTHER PUBLICATIONS

Arkdzhovskii et al., Sb. Tr., Vses. Nauch–Issled. Inst. Novykh Stroit. Mater. 7, 110– 20(1966)

*Primary Examiner*—Melvin Goldstein
*Attorney*—Olin E. Williams, Oscar B. Brumback and Synnestvedt & Lechner

[57] ABSTRACT

An unsaturated polyester prepared by reacting under esterification conditions the following reactants;
a. an ethylenically unsaturated dicarboxylic acid;
b. tetrahydrophthalic anhydride or endomethylene tetrahydrophthalic anhydride;
c. an aliphatic saturated dicarboxylic acid or a dimer or trimer of an ethylenically unsaturated aliphatic monocarboxylic acid; and
d. cyclohexanedimethanol or a mixture of neopentyl glycol and a second dihydric alcohol.

Upon crosslinking or curing the unsaturated polyester with a vinyl monomeric crosslinking agent, there can be obtained products having improved thermal stability properties.

17 Claims, No Drawings

UNSATURATED POLYESTERS

BACKGROUND OF THE INVENTION

This invention relates to unsaturated polyesters, to a polymerizable composition containing said polyester and a vinyl monomeric crosslinking agent and to the thermoset polymer prepared from the polymerized composition. More particularly, this invention relates to an unsaturated polyester which upon being reacted with a vinyl monomeric crosslinking agent can be formed into a thermoset polymeric article having improved properties, including improved thermal stability properties.

Unsaturated polyesters which are prepared by reacting an ethylenically unsaturated dicarboxylic acid (or an anhydride thereof), a dihydric alcohol and, optionally, a saturated dicarboxylic acid (or an anhydride thereof) are well known. An example of such a polymer is one prepared from maleic anhydride, ethylene glycol and phthalic anhydride.

Such polyesters can be reacted or cured with a vinyl monomeric crosslinking agent, such as styrene, and formed into articles which have generally good physical and electrical properties and good chemical resistance and weathering characteristics. Fibrous reinforcements, such as glass fibers, are added usually to the polymerizable composition for the purpose of improving the strength of articles made therefrom.

A shortcoming of various of the heretofore known cured polyester resins of the type described above has been their tendency to degrade when exposed to elevated temperatures for even relatively short periods of time—for example, a few hours at temperatures in excess of 200° C. Under such conditions, the properties, for example the physical and electrical properties, of the cured polyester resin tend to suffer as a result of a softening of the resin.

In addition, such properties tend to deteriorate as a result of a degradation of the cured polyester resin due to volatization of ingredients comprising the resin. Analysis of a cured resin that has been exposed to elevated temperatures for even relatively short periods of time shows that the resin has lost weight and its properties do not measure up to those it had before it was heated.

There have been some developments designed to provide cured polyester-type thermoset polymers having improved heat resistance or thermal stability. Speaking generally, the developments have included the formulation of the unsaturated polyester condensate from a specific combination of reactants. However, it has been suggested that the heat deterioration problem of the cured polyester resin is due not to the polyester linkage of the resin but to the vinyl crosslinked portion of the resin.

Whatever the source of the problem, various of the heretofore proposed solutions have disadvantages. For example, often the thermal stability properties of the cured polyester resin are improved at the expense of reducing other properties. Also, some unsaturated polyesters that can be cured into thermoset articles having improved thermal stability tend to be incompatible with vinyl monomeric crosslinking agents. This creates problems in fabricating the polymerizable composition into the cured article.

Thus, it would be advantageous to have available cured polyester resins which have improved thermal stability properties and generally good physical and electrical properties, as well as the other excellent properties that are present usually in this class of resins. This would enable the resins to be used in applications, particularly electrical applications, where they cannot now be used.

U.S. Pat. Nos. 3,530,202, 3,533,999 and 3,560,445 disclose unsaturated polyesters which upon being crosslinked with a vinyl monomeric crosslinking agent provide products which have high thermal resistance, good heat distortion values and good electrical properties, as well as good mechanical and chemical properties. In addition, the polyesters of these patents are compatible with vinyl monomeric crosslinking agents.

The aforementioned U.S. Pat. No. 3,533,999 discloses an unsaturated polyester formed by the esterification of:
A. an acid reactant consisting essentially of:
1. 5 to 44 mole percent of tetrahydrophthalic anhydride or endo-cis-bicyclo (2.2.1)-5-heptene-2,3-dicarboxylic acid anhydride and lower alkyl substituted products thereof; and
2. 6 to 45 mole percent of maleic anhydride; and
B. a dihydric alcohol reactant consisting essentially of:
1. 10 to 30 mole percent of 2,2-dimethyl-1,3-propanediol (neopentyl glycol); and
2. 20 to 40 mole percent of a second dihydric alcohol.

The aforementioned ingredients are reacted under conventional esterification reaction conditions. Thus, the mole ratio of the acid reactant, (A) above, and the dihydric alcohol reactant, (B) above, should be about 1 to 1; however, an excess of the dihydric alcohol reactant, for example about 10 percent by weight, should be used to allow for the loss of some alcohol as a result of its boiling off with the by-product water that is formed. The esterification is carried out under an inert blanket of gas, such as nitrogen, at a temperature within the range of 180°–220° C. for a period of about 6–20 hours until an acid number below 100 preferably below 50 is obtained (based on milliequivalents of KOH necessary to neutralize 1 gram of the polyester).

In preparing the polyester, the sum of the mole percent of the ingredient (A) (1) above and ingredient (B) (1) above should constitute at least 20 mole percent of the polyester.

The resulting polyester can be dissolved in and subsequently copolymerized with any of the well-known ethylenically unsaturated monomers used as solvents and copolymerizable monomers for polyesters. Examples of such monomers include styrene, alpha-methyl styrene, vinyl toluene, divinyl benzene, chlorostyrene and the like, as well as mixtures of the above monomers.

The aforementioned U.S. Pat. No. 3,530,202 discloses an unsaturated polyester formed by the esterification of:
A. an unsaturated dicarboxylic acid anhydride consisting essentially of:
1. 7 to 15 mole percent of tetrahydrophthalic anhydride or endo-cis-bicyclo (2.2.1)-5-heptene-2,3-dicarboxylic acid anhydride and lower alkyl substituted products thereof; and
2. 35 to 43 mole percent of maleic anhydride; and
B. a dihydric alcohol reactant, namely 1,4-cyclohexanedimethanol.

The method for preparing the polyester and the monomers with which they can be polymerized are as set forth above in connection with the discussion of the polyester disclosed in U.S. Pat. No. 533,999.

The aforementioned U.S. Pat. No. 3,560,445 discloses an unsaturated polyester formed by the esterification of:
A. an unsaturated dicarboxylic anhydride consisting essentially of:
1. 5 to 44 mole percent of tetrahydrophthalic anhydride or endo-cis-bicyclo (2.2.1)-5-heptene-2,3-dicarboxylic acid anhydride and lower alkyl substituted products thereof; and
2. 6 to 45 mole percent of maleic anhydride; and
B. a dihydric alcohol reactant consisting essentially of:
1. 5 to 40 mole percent of 1,4-cyclohexane-dimethanol; and
2. 10 to 45 mole percent of a second dihydric alcohol;
wherein the sum of the mole percent of 1,4 cyclohexanedimethanol and ingredient (A) (1) above is at least 20 mole percent of the polyester.

The method for preparing the polyester and the monomers with which they can be polymerized are as set forth above in connection with the discussion of the polyester disclosed in U.S. Pat. No. 3,533,999.

In a preferred embodiment of the invention described in U.S. Pat. No. 3,560,445 it is taught that the polyester described therein, when subsequently copolymerized with an ethylenically unsaturated monomer such as styrene, yields a product which has superior chemical resistance if the second dihydric alcohol used in the esterification is 2,2-diemthyl-1,3-propanediol (neopentyl glycol). When neopentyl glycol is used as the second dihydric alcohol, the crosslinked polyester withstands not only water and caustic attack for longer periods of time, but resists acid attack as well.

The present invention relates to the modification of polyesters of the type described hereinabove which modified polyesters can be cured into products having even more improved thermal stability properties.

An object of this invention is to provide an unsaturated polyester which upon being polymerized with a vinyl monomeric crosslinking agent produces a thermoset plastic article which has improved thermal stability properties.

Another object of this invention is to provide a cured polyester resin which has, in addition to improved thermal stability properties, good overall physical and electrical properties.

SUMMARY OF THE INVENTION

In accordance with this invention, it has been found that an unsaturated polyester condensate that is prepared by reacting a combination of specifically selected reactants can be used to prepare articles having outstanding thermal stability properties in combination with good overall properties, particularly electrical properties. Generally speaking, the unsaturated polyesters included within the scope of this invention are prepared by reacting:

A. an ethylenically unsaturated dicarboxylic acid;
B. an aliphatic saturated dicarboxylic acid — for example, succinic, adipic, azelaic, etc., or a dimer or a trimer of an ethylenically unsaturated aliphatic monocarboxylic acid;
c. tetrahydrophthalic anhydride or endomethylene tetrahydrophthalic anhydride; and
D. a dihydric alcohol reactant comprising either cyclohexanedimethanol or a mixture of neopentyl glycol and a second dihydric alcohol.

With respect to the above ingredients, the term "acid" when used herein includes the anhydrides of those acids for which anhydrides exist. This is because the acid and its corresponding anhydride will react in the same way in the esterification reaction.

It has been found that the unsaturated polyester prepared by reacting the aforementioned ingredients can be reacted with a vinyl monomeric crosslinking agent and cured into articles that at ambient temperatures have good overall properties, including particularly good electrical properties. Upon subjecting the cured polyester resins to elevated temperatures for even extended periods of times the resins resist degradation. Thus, they have excellent thermal stability properties. The cured resins have a reduced tendency to volatize at elevated temperatures — for example, at temperatures as high as 200° C even when exposed thereto for prolonged periods of time — for example, over 1 month.

Thus, the invention can be used to produce articles which can be used in applications where very good electrical properties are needed and/or in applications where the articles are exposed to elevated temperatures for prolonged periods of time. Under such conditions, the articles will tend to retain their mechanical and electrical properties. Examples of articles which can be prepared advantageously from the resins of this invention are filament wound tubes, cast insulators and electrical grade shapes such as sheets, buckets and booms.

A very surprising facet of this invention is that the presence of relatively small amounts (about 1.0 mole percent of ingredient (B) above, that is the aliphatic saturated dibasic acid or the aforementioned dimer or trimer acids in the polyester results in a quite remarkable improvement in its thermal stability properties. This will be appreciated more fully below in connection with the discussion of the examples. It is noted also that as the amount of this ingredient is increased, quite good improvements can be obtained in the flexibility properties of the cured resin. This provides for the production of cured polyester articles which have a combination of properties hot heretofore available.

As will be described more fully below, the unsaturated polyesters described herein can be prepared under reaction conditions which are generally used in preparing heretofore known unsaturated polyesters and they can be combined with other ingredients that are added generally to polymerizable polyester formulations which are curable and moldable into articles according to available techniques.

DETAILED DESCRIPTION OF THE INVENTION

Turning now to a detailed description of the invention, the unsaturated polyester included within the scope of this invention comprises the esterification product of:

A. an acid reactant comprising:
1. about 15 to about 45 mole percent and preferably about 25 to about 40 mole percent of an ethylenically unsaturated dicarboxylic acid;
2. about 1 to about 25 mole percent and preferably about 1 to about 12 mole percent of an aliphatic saturated dicarboxylic acid or a dimer or trimer of an ethylenically unsaturated aliphatic monocarboxylic acid;
3. about 5 to about 20 mole percent and preferably about 10 to about 15 mole percent of tetrahydrophthalic anhydride or endomethylene tetrahydrophthalic anhydride; and B. a dihydric alcohol reactant comprising either cyclohexanedimethanol or a mixture of about 20 to about 40 mole percent and preferably about 25 to 35 mole percent of neopentyl glycol and about 10 to about 30 mole percent and preferably about 15 to about 25 mole percent of a second dihydric alcohol.

Each of the aforementioned reactants which are used to prepare the unsaturated polyesters of this invention and processes for preparing the reactants are well known.

As to the ethylenically unsaturated dicarboxylic acid component, it is preferred to utilize either maleic anhydride or fumaric acid. Excellent results have been achieved with these reactants; and they are readily available. However, other acids from this class of compounds can be used. Examples of such acids are itaconic acid, citraconic acid, chloromaleic acid and mesaconic acid.

With respect to the aliphatic saturated dicarboxylic acids, they are a well recognized group of compounds. (For example, see *Organic Chemistry* by Paul Karrer, Nordeman Publishing Company, Inc., 1938). Included within this group of compounds are acids, such as the following: succinic acid, glutaric acid, adipic acid, pimelic acid, sebacic acid, azelaic acid, suberic acid, nonane-dicarboxylic acid, decane-dicarboxylic acid and undecane-dicarboxylic acid. Higher molecular weight acids can be used also, for example those containing even 20 or more carbon atoms. In addition, mixtures of the acids can be used. Preferred acids are adipic, azelaic and sebacic.

It is recommended that the very low molecular weight aliphatic saturated dicarboxylic acids be not used in the polyesters of this invention when they are prepared at conventional reaction temperatures (for example, 180° to 220° C). Malonic acid (three carbon atoms) and oxalic acid (two carbon atoms) tend to decarboxylate at or below such reaction temperatures. Thus it is preferable to use an acid that is stable within the normal temperature ranges used for polyesterification reactions. Generally speaking, this will include acids that have four or more carbon atoms.

Instead of utilizing an aliphatic saturated dicarboxylic acid to prepare a polyester within the scope of this invention, there can be used a dimer or trimer of an ethylenically unsaturated aliphatic monocarboxylic acid. Processes for the preparation of such dimers or trimers are well known; however, there is uncertainty regarding the exact structure of such compounds. The dimer acid contains two carboxyl groups and the trimer acid contains three carboxyl groups. Generally speaking, such materials are prepared from ethylenically unsaturated aliphatic monocarboxylic acids having between 14 and 22 carbon atoms. Examples of such acids are myristoleic, oleic, linolenic, ricinoleic, etc. The preferred acid is the dimerized product of linoleic acid, an unsaturated $C_{18}$ fatty acid. The aforementioned dimers and trimers are sold by Emery Industries, Inc. as Empol dimer or trimer acids.

The reaction mixture should contain at least about 1 mole percent of the aliphatic saturated dicarboxylic acid or the aforementioned dimer or trimer acids. When lesser amounts are used, there is a tendency for the improvement in the thermal stability properties of the cured resin product to be relatively insignificant. On the other hand, if the reaction mixture contains more than about 25 mole percent of this acid reactant, there is a tendency for the cured resin product to be too soft to permit sustained use at elevated temperatures. Cured resins with particularly good combinations of properties have been prepared from polyesters made from reaction mixtures that contain from about 1 to about 12 mole percent of this acid reactant.

The tetrahydrophthalic anhydride component is a dicarboxylic anhydride containing a double bond. This anhydride, also referred to as cyclohexene-1,2-dicarboxylic anhydride, can exist in various isomeric forms, depending for example on the position of the double bond in the ring. Excellent results have been obtained by utilizing 4-cyclohexene-1,2-dicarboxylic anhydride (often referred to as delta-4 tetrahydrophthalic anhydride) in preparing the polyesters of this invention. However, the 1-,2-, or 3-cyclohexene-1,2-dicarboxylic anhydride isomer, as well as mixtures thereof, can be used also. The following U.S. patents disclose methods for preparing tetrahydrophthalic anhydrides: U.S. Pat. No. 2,764,597; U.S. Pat. No. 2,959,599; and U.S. Pat. No. 3,085,096.

Although it is preferred to use tetrahydrophthalic anhydride, endomethylene tetrahydrophthalic anhydride can be used instead. Examples of the latter are endo-cis-bicyclo (2.2.1)-5-heptane-2,3-dicarboxylic anhydride and lower alkyl (1–4 carbon atoms) substituted products thereof.

The reaction mixture should contain at least about 5 mole percent of tetrahydrophthalic anhydride or endomethylene tetrahydrophthalic anhydride. When lesser amounts are used, there is a tendency for thermal stability properties of the cured resin product to be less than desirable. On the other hand, if the reaction mixture contains more than about 20 mole percent of this acid reactant, there is a tendency for the cured resin product to be relatively soft or poor in strength. Cured resins with particularly good combinations of properties have been prepared from polyesters made from reaction mixtures that contain from about 10 to about 15 mole percent of this acid reactant.

As to the dihydric alcohol reactant, it is noted that the unsaturated polyesters of this invention must be prepared from a reaction mixture that contains either cyclohexanedimethanol or neopentyl glycol—the latter always being used in combination with a second dihydric alcohol. When the former is used, it is not necessary to have another dihydric alcohol present in the reaction mixture. However, when neopentyl glycol is used, there must be in the reaction mixture a second dihydric alcohol. In the absence of another dihydric alcohol, the thermal stability properties of resultant cured product has a tendency to be somewhat less than desired. Examples of glycols that can be used in combination with neopentyl glycol are the following: ethylene glycol, propylene glycol and diethylene glycol.

With respect to the use of cyclohexane dimethanol, it is preferred to utilize the 1,4 isomer. Although it is not necessary to use a second dihydric alcohol in combination with cyclohexanedimethanol, another dihydric alcohol can be used. Examples of such alcohols are mentioned above in connection with the neopentyl glycol. When cyclohexanedimethanol is used in combination with another glycol, the former should comprise at least about 10 mole percent and preferably at least about 20 mole percent of the reaction mixture. It is preferred that the alcohol reactant comprise a mixture of both 1,4-cyclohexanedimethanol and neopentyl glycol. Exceptionally good results are obtained with these diols.

A dihydric alcohol can be represented by the formula: R—$(OH)_2$ wherein R is an alkylene having from about two to about six carbon atoms, hydrogenated phenylene, hydrogenated biphenylene, or a hydrogenated bis-phenol of the following formula:

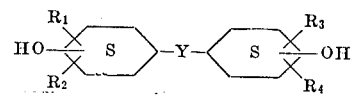

wherein $R_1$, $R_2$, $R_3$, and $R_4$ are the same or different and are selected from the group consisting of hydrogen and lower alkyl, and Y is a lower alkylene.

The unsaturated polyester of this invention can be prepared according to known methods. Standard equipment and available techniques can be employed. For example, the polyesterification reaction should be carried out under an inert blanket of gas such as nitrogen and the reaction vessel should be equipped with a stirrer and means for removing the water formed from the esterification reaction. In addition, a gelation inhibitor such as, for example, hydroquinone can be added to the reaction mixture. Also, the polyesterification reaction can be carried out in the presence of an esterification catalyst.

Exemplary reaction temperatures and times are about 190° C to about 210° C and about 8 hours to about 10 hours respectively. Preferably, the reaction should be allowed to proceed until the polyester has an acid number within the range of about 20 to about 40.

In accordance with standard techniques, a two stage reaction can be used when preparing polyesters from ingredients that have a relatively low reactivity and which would have a tendency to cause the reaction mixture to gel due to the polyesters reacting with themselves at the higher temperatures that would be needed to make the ingredients react at a practical rate.

The ratio of the amounts of acid reactant and alcohol reactant charged to the reaction vessel can be a ratio used typically in a polyesterification reaction. Speaking generally, the total moles of acid present in the reaction mixture should be about equal to the total moles of alcohols used; however, it is preferred that there be charged to the reaction vessel an excess of about 5 mole percent of the alcohol reactant. The excess of the alcohol can compensate for losses due to boiling-off of the alcoholic ingredients.

Polymerizable compositions that can be molded and cured into articles can be prepared by combining the unsaturated polyester described herein with available vinyl monomeric crosslinking agents which are capable of polymerizing with the unsaturated polyester. Examples of crosslinking agents, which is noted contain the

group, are styrene, vinyl toluene, alphamethyl styrene, cholorostyrene and tert-butylstyrene. Other crosslinking agents can be used. Expedient amounts of the crosslinking agent can be used. By way of example, a polymerizable composition can contain about 50 to about 70 wt. percent of the polyester and about 30 to about 50 wt. percent of the crosslinking agent.

A preferred crosslinking agent is vinyl toluene. As will be seen from the examples set forth below, excellent results have been obtained with this material.

In addition, the polymerizable composition containing the unsaturated polyester and the crosslinking agent can contain other materials often included in this class of compositions. Examples of such materials include fillers, initiators or catalysts, crosslinking and stabilizing inhibitors, accelerators or promoters, pigments, mold release additives, fibrous reinforcements, chemical thickening agents (such as for example, magnesium oxide) and thermoplastic polymers such as, for example, polystyrene, polymethylmethacrylate, styrene-acrylonitrile copolymer as well as others.

The polymerizable composition can be cured and molded into articles according to available techniques including for example, vacuum and pressure bag techniques and pultrusion; or articles can be made in matched-metal molds utilizing premix or wet lay-up techniques. In addition, the polymerizable compositions can be formed into chemically thickened mats or prepregs which can be molded in a matched-metal mold.

EXAMPLES

Examples set forth below are illustrative of compositions within the scope of this invention. The reaction equipment used to prepare the unsaturated polyesters described below included a reaction vessel suited for carrying out a polyesterification reaction and thus equipped with a stirrer, a reflux condenser and apparatus for maintaining the polyesterification reaction under an inert blanket of nitrogen.

In each of the examples reported below, the tetrahydrophthalic anhydride reactant was the cis-delta-4 isomer; the molecular weight of the unsaturated polyester is the number average molecular weight; and viscosities of the polyester crosslinking agent solutions were measured at room temperature with Brookfield Viscometers.

EXAMPLE 1

An unsaturated polyester was prepared from a reaction mixture containing the following:

| Ingredients | Moles |
| --- | --- |
| maleic anhydride | 2.0 |
| azelaic acid | 1.0 |
| tetrahydrophthalic anhydride | 1.0 |
| neopentyl glycol | 2.0 |
| ethylene glycol | 2.2 |

The mixture was heated to about 200° C and maintained at this temperature for about 7 hours. The unsaturated polyester had an acid number of about 31 and a molecular weight of about 1,200.

Examples 2-5 below show the preparation of unsaturated polyesters within the scope of this invention from reaction mixtures alike in all respects except for the variation of the concentrations of the azelaic acid and maleic anhydride components.

EXAMPLE 2

An unsaturated polyester was prepared according to the method described in Example 1 from a reaction mixture containing:

| Ingredients | Moles |
| --- | --- |
| maleic anhydride | 2.0 |
| azelaic acid | 1.0 |
| tetrahydrophthalic anhydride | 1.0 |
| 1,4-cyclohexanedimethanol | 2.0 |
| neopentyl glycol | 2.0 |

The condensate had an acid number of 27, a fumarate content of 73 percent and a molecular weight of about 2,100. A solution containing 60 wt. percent of the polyester and 40 wt. percent of vinyl toluene had a viscosity of about 650 cps.

EXAMPLE 3

An unsaturated polyester was prepared as described in Example 2, but from a reaction mixture that contained 0.75 mole of azelaic acid and 2.25 moles of maleic anhydride. The condensate had an acid number of 27, a fumarate content of 66 percent and a molecular weight of about 1,900.

EXAMPLE 4

An unsaturated polyester was prepared as described in Example 2. The polyester condensate had an acid number of 24, a fumarate content of 73 percent, and a molecular weight of about 1,900. A solution containing 60 wt. percent of the polyester and 40 wt. percent of vinyl toluene had a viscosity of 650 cps.

EXAMPLE 5

An unsaturated polyester was prepared as described in Example 2, but from a reaction mixture that contained 1.25 moles of azelaic acid and 1.75 moles of maleic anhydride. The reaction product had an acid number of 24, a fumarate content of 66 percent and a molecular weight of about 1,800.

Examples 6–10 below show the preparation of unsaturated polyesters within the scope of this invention made from reaction mixtures alike in all respects except for the use of different aliphatic saturated dicarboxylic acids.

EXAMPLE 6

An unsaturated polyester was prepared as described in Example 2, but from a reaction mixture that contained 1 mole of succinic acid instead of 1 mole of azelaic acid. The condensate had an acid number of 31.

EXAMPLE 7

An unsaturated polyester was prepared as described in Example 2, but from a reaction mixture that contained 1 mole of adipic acid instead of 1 mole of azelaic acid. The polyester had an acid number of 22, a fumarate content of 81 percent, and a molecular weight of about 2,000. A solution containing 60 wt. percent of the condensate and 40 wt. percent of vinyl toluene had a viscosity of 800 cps. A solution containing 60 wt. percent of the condensate and 40 wt percent of tert-butylstyrene had a viscosity of 4,500 cps.

EXAMPLE 8

An unsaturated polyester was prepared as described in Example 2 but from a reaction mixture that contained 1 mole of sebacic acid instead of 1 mole of azelaic acid. The polyester had an acid number of 23, a fumarate content of 76 percent and a molecular weight of about 2,100. A solution containing 60 wt. percent of the polyester and 40 wt. percent of vinyl toluene had a viscosity of about 900 cps.

EXAMPLE 9

An unsaturated polyester was prepared as described in Example 2, but from a reaction mixture that contained 0.5 mole of azelaic acid and 0.5 mole of adipic acid instead of 1 mole of azelaic acid. The polyester had an acid number of 23, a fumarate content of 73 percent and a molecular weight of about 2,200. A solution containing 60 wt. percent of the polyester and 40 wt. percent of vinyl toluene had a viscosity of 750 cps. A solution containing 60 wt. percent of the polyester and 40 wt. percent of tert-butylstyrene had a viscosity of 3,100 cps.

EXAMPLE 10

An unsaturated polyester was prepared as described in Example 2, but from a reaction mixture that contained 1 mole of an aliphatic dimer acid ( a $C_{36}$ ethylenically unsaturated aliphatic dibasic acid prepared by polymerizing unsaturated $C_{18}$ fatty acids and sold as Empol Dimer 1014) instead of 1 mole of azelaic acid. The polyester had an acid number of 26, a fumarate content of 56 percent and a molecular weight of about 2,200. A solution containing 60 wt. percent of the polyester and 40 wt. percent of vinyl toluene had a viscosity at room temperature of about 450 cps.

Examples 11 and 12 below show the preparation of unsaturated polyesters within the scope of this invention from reaction mixtures which contain glycols, other than neopentyl glycol, in combination with 1,4-cyclohexanedimethanol.

EXAMPLE 11

An unsaturated polyester was prepared as described in Example 2, but from a reaction mixture that contained 2 moles of ethylene glycol instead of 2 moles of neopentyl glycol. The product had an acid number of 24, a fumarate content of 59 percent and a molecular wt. of about 1,700. A solution containing 60 wt. percent of the polyester and 40 wt. percent of vinyl toluene had a viscosity of 500 cps.

EXAMPLE 12

An unsaturated polyester was prepared from a reaction mixture containing the following:

| Ingredients | Moles |
| --- | --- |
| maleic anhydride | 1.74 |
| azelaic acid | 0.87 |
| tetrahydrophthalic anhydride | 0.87 |
| 1,4-cyclohexanedimethanol | 1.74 |
| 2,2,4-trimethylpentanediol | 1.91 |

The trimethylpentanediol, azelaic acid, tetrahydrophthalic anhydride and maleic anhydride ingredients were charged to the reaction vessel. The reaction mixture was heated for 7 hr. at 175° C and then cooled to about 100° C. The cyclohexanedimethanol ingredient was added to the reaction mixture and heating was continued for 3 hr. at 200° C. The polyester had an acid number of 40, a fumarate content of 92 percent, and a molecular weight of about 1,200. A solution containing 60 wt. percent of the polyester and 40 wt. percent of vinyl toluene had a viscosity of 350 cps. A solution containing 60 wt. percent of the polyester and 40 wt. percent of tertbutylstyrene had a viscosity of 1,900 cps.

Examples 13-17 below show the preparation of polyesters within the scope of this invention from reaction mixtures alike in all respects except for the use of different amounts of maleic anhydride and adipic acid.

EXAMPLE 13

An unsaturated polyester was prepared according to the method described in Example 1 from a reaction mixture containing:

| Ingredients | Moles |
| --- | --- |
| maleic anhydride | 2.9 |
| adipic acid | 0.1 |
| tetrahydrophthalic anhydride | 1.0 |
| neopentyl glycol | 2.0 |
| 1,4-cyclohexanedimethanol | 2.0 |

The polyester had an acid number of 39.

EXAMPLE 14

An unsaturated polyester was prepared as described in Example 13, but from a reaction mixture that contained 0.5 mole of adipic acid and 2.5 moles of maleic anhydride. The resulting polyester had an acid number of 29.

EXAMPLE 15

An unsaturated polyester was prepared as described in Example 13, but from a reaction mixture that contained 1 mole of adipic acid and 2 moles of maleic anhydride. The polyester had an acid number of 22.

EXAMPLE 16

An unsaturated polyester was prepared as described in Example 13, but from a reaction mixture that contained 1.5 moles of adipic acid and 1.5 moles of maleic anhydride.

EXAMPLE 17

An unsaturated polyester was prepared as described in Example 13, but from a reaction mixture that contained 2 moles of adipic acid and 1 mole of maleic anhydride. The polyester had an acid number of 30.

The next example is illustrative of a polyester within the scope of this invention that can be prepared from a long chain tricarboxylic acid.

EXAMPLE 18

An unsaturated polyester is prepared from a reaction mixture containing 2.98 moles of maleic anhydride, 0.02 mole of a trimer acid (Empol 1040), 1 mole of tetrahydrophthalic anhydride and 2 moles each of neopentyl glycol and 1,4-cyclohexanedimethanol.

The excellent thermal stability and generally good overall properties of cured polyester resins within the scope of this invention are exemplified in test results reported in Tables 1-5 below. The test results were obtained by subjecting castings made from polyesters of the above examples to the various tests identified in the table.

Test castings were prepared from the polyesters of Example 1, Examples 3-9 and Examples 11-17 as follows. A solution of 60 wt. percent of the unsaturated polyester of the example and 40 wt. percent of vinyl toluene was prepared. To this solution there was added 0.75 wt. percent based on the weight of the solution of powdered benzoyl peroxide crosslinking catalyst. The solution was cured between two glass panes into a ⅛ inch thick casting by heating for 2 hours at 75° C and then for 2 hours at 150° C. The castings are identified in the tables below by the example number of the composition from which it was made followed by the letter "C."

Test castings were prepared also from the polyesters of Examples 2 and 10 according to the following method. A solution of 60 wt. percent of the polyester of the example and 40 wt. percent of vinyl toluene crosslinking agent was prepared. To this solution there was added 0.75 wt. percent based on the weight of the solution of 2,5 dimethylhexane-2,5-diper (2-ethyl) hexoate (USP—245). The solution was cured between 2 glass panes into a ⅛ inch coasting by heating for 2 hours at 60° C, 1 hour at 75° C and 2 hours at 150° C. The castings are identified in the tables as "Ex. 2C" and "Ex. 10C."

As will be observed, the tables show the extent to which the castings resist degradation as a result of volatilization due to heating at the temperatures indicated in the tables and for the periods of time set forth. These tests were carried out by placing the castings in a circulating air oven. The approximate dimensions of the castings were ⅛ × ½ × 1.5".

It is noted that the test results are expressed in percent loss of weight of the casting—the lower percent loss of weight, the better the thermal stability properties. Other properties, measured by conventional tests, are reported in the tables also.

In Table 1 below, there are shown the properties of test castings made from compositions alike in all respects except for the polyesters which differ because they were made from reaction mixtures that contained varying amounts of azelaic acid and maleic anhydride. In Table 1 under the example number, the number of moles of the azelaic acid is set forth and it is followed by the number of moles of maleic anhydride.

TABLE 1

| PROPERTIES | TEST SAMPLES | | |
|---|---|---|---|
| | Ex. 3C (0.75/2.25) | Ex. 4C (1/2) | Ex. 5C (1.25/1.75) |
| ASTM D-638 | | | |
| Ten. Strength, psi | 8,100 | 7,800 | 5,000 |
| Modulus × $10^{-3}$, psi | 406 | 394 | 281 |
| % Elongation | 3.1 | 3.3 | 6.9 |
| % Weight lost at 220°C after: 6 wk. | 5.8 | 5.7 | 7.1 |
| % Weight lost at 260°C after: 1 wk. | 6.4 | 6.2 | 7.3 |
| 6 wk. | 12 | 11 | 14 |

The extent to which the presence of even very small amounts of the azelaic acid reactant influences the thermal stability properties of the cured resin can be appreciated when it is considered that a casting made from an unsaturated polyester alike in all respects to that of Example 3, except for the absence of the azelaic acid component and the use of 3 moles of maleic anhydride, had a weight loss of 31 percent after a 1 week exposure to a temperature of 260° C (compared to the 6.4 percent of the casting of Example 3C).

In Table 2 below there is set forth the properties of test castings made from polymerizable compositions containing the polyesters of Example 2 and 6-10 which are alike in all respects except for the use of different aliphatic saturated dibasic acids. It is noted that the casting of Example 2C was cured under different conditions than those of Examples 6C-10 C as mentioned hereinabove.

TABLE 2

| Properties | Test samples | | | | | |
|---|---|---|---|---|---|---|
| | Ex. 2C (azelaic) | Ex. 6C (succinic) | Ex. 7C (adipic) | Ex. 8C (sebacic acid) | Ex. 9C (azelaic and adipic) | Ex. 10C (dimer acid) |
| ASTM D-638: | | | | | | |
| Tensile strength, p.s.i. | 7,800 | 9,300 | 8,600 | 7,400 | 8,000 | 2,400 |
| Percent elongation | 5.2 | 3.1 | 6.7 | 3.1 | 3.8 | 9.8 |
| Percent weight lost at 220° C. after— | | | | | | |
| 1 week | 3.5 | 3.3 | 3.7 | 4.1 | | 4.5 |
| 2 weeks | 4.3 | 4.0 | 4.7 | 4.3 | | 5.1 |
| 3 weeks | 4.8 | 4.2 | 5.1 | 4.9 | 5.0 | 5.6 |
| 4 weeks | 5.2 | 4.2 | 5.7 | | | 5.6 |
| 5 weeks | 5.4 | 4.3 | 5.9 | | | 6.0 |
| 6 weeks | 5.7 | 4.5 | 5.9 | 5.8 | | 6.2 |
| Percent weight lost at 260° C. after— | | | | | | |
| 1 week | 5.9 | 5.7 | 6.5 | 6.6 | | 6.3 |
| 2 weeks | 6.9 | 6.5 | 8.4 | 7.7 | | 8.9 |
| 3 weeks | 7.8 | 7.2 | 9.8 | 8.9 | | 13 |
| 4 weeks | 8.6 | 7.5 | 12 | | | 20 |
| 5 weeks | 9.9 | 8.2 | 14 | | | 25 |
| 6 weeks | 11 | 8.6 | 15 | 12* | | 28 |

*Estimated from measurement taken after 7½ weeks.

In connection with the weight loss properties reported in Table 2 above, it is noted that a casting made from a composition alike in all respects to those from which the castings identified in the table were made, except that the unsaturated polyester was made from a reaction mixture that contained no aliphatic saturated dicarboxylic acid and 3 moles of maleic anhydride, had thermal stability properties at 220° C which were somewhat similar to castings of the table; but surprisingly, the percent weight loss of the casting at 260° C was 31 after only 1 week (compared to 6.6 percent—the highest value reported in the table).

In Table 3 below there are shown the test results of castings made from polyesters which contained different dihydric alcohol reactants.

TABLE 3

| Properties | TEST SAMPLE | | |
|---|---|---|---|
| | Ex. 1C neopentyl glycol & ethylene glycol | Ex. 11C ethylene glycol & 1,4-cyclo. | Ex. 12C 2,2,4-trimethylpentanediol & 1,4-cyclo. |
| ASTM D-638 | | | |
| Ten. Strength, psi | 4,400 | 6,400 | 6,300 |
| % Elongation | 6.0 | 4.1 | 3.8 |
| % Weight lost at 220°C after: 1 wk. | 5.8 | 4.0 | 6.3 |
| 2 wk. | 7.0 | 4.8 | 7.0 |
| 3 wk. | 7.7 | 5.5 | 7.6 |
| 4 wk. | 8.4 | 6.1 | 8.2 |
| 5 wk. | — | 6.4 | 8.7 |
| 6 wk. | — | 6.7 | 9.0 |
| % Weight lost at 260°C after: 1 wk. | 9.4 | 7.2 | — |
| 2 wk. | 11 | 9.3 | — |
| 3 wk. | — | 11 | — |
| 4 wk. | — | 13 | — |
| 5 wk. | — | 14 | — |
| 6 wk. | — | 15 | — |

In Table 4 below, there are shown the properties of various castings made from polymerizable compositions alike in all respects except for the use of polyesters made from reaction mixtures that contained different concentrations of the adipic acid and maleic anhydride components. In the table under the example number, the number of moles of adipic acid is set forth and it is followed by the number of moles of maleic anhydride.

TABLE 4

| Properties | Test samples | | | | |
|---|---|---|---|---|---|
| | Ex. 13C (0.1/2.9) | Ex. 14C (0.5/2.5) | Ex. 15C (1/2) | Ex. 16C (1.5/1.5) | Ex. 17C (2/1) |
| ASTM D-638: | | | | | |
| Tensile strength, p.s.i. | 2,900 | 3,700 | 8,600 | 4,900 | 1,800 |
| Percent elongation | 0.7 | 0.8 | 6.7 | 3.3 | 13 |
| Deflection temp., °F | 251 | 198 | 158 | 110 | (*) |
| Percent weight lost at 220° C. after— | | | | | |
| 1 week | 2.0 | 2.4 | 3.7 | 5.6 | 7.5 |
| 2 weeks | 2.7 | 3.1 | 4.7 | 6.2 | 8.3 |
| 3 weeks | 3.0 | 3.2 | 5.1 | 6.4 | 8.5 |
| 4 weeks | 3.6 | 3.2 | 5.7 | 6.4 | 8.8 |
| 5 weeks | 4.0 | 3.4 | 5.9 | 6.7 | 8.8 |
| 6 weeks | 4.2 | 3.5 | 5.9 | 6.7 | 9.0 |
| Percent weight lost at 260° C. after— | | | | | |
| 1 week | 10 | 4.3 | 6.5 | 7.4 | 9.2 |
| 2 weeks | 19 | 5.2 | 8.4 | 8.6 | 10 |
| 3 weeks | 26 | 5.9 | 9.8 | 10 | 11 |
| 4 weeks | | 6.3 | 12 | 11 | 11 |
| 5 weeks | | 7.0 | 14 | 12 | 12 |
| 6 weeks | | 7.5 | 15 | 12 | 13 |

*Deflected under load at 77° F.

Attention is directed to Example 13C in Table 4 above. It is noted that the amount of adipic acid that was used in preparing the unsaturated polyester that was used in making the casting of this example was very, very small, that is, 0.1 mole (1.25 mole percent). However, the thermal stability properties of the casting at 260° C were very much better than a casting prepared from an unsaturated polyester that contained no adipic acid, that is, one prepared from a polyester that was made from a reaction mixture alike in all respects to that of Example 13, but containing no adipic acid and 3 moles of maleic anhydride. The percent wt. loss of such a casting was 31 after 1-week's exposure to a temperature of 260° C compared to the 10 percent wt. loss of the casting of Example 13C. This comparison highlights the significant thermal stability improvements that are attained when even very, very small amounts of the aliphatic saturated dicarboxylic acid is used.

To illustrate the generally good electrical and physical properties of cured polyester resins within the scope of this invention, there is set forth below in Table 5 electrical properties of castings made from the polyester of Example 4 above. In addition, there is set forth also the electrical properties of a cured polyester prepared as described in Example 2 above, but from a reaction mixture that contained 1 mole of adipic acid instead of 1 mole of azelaic. The polyester (Example 19) had an acid number of 25, a fumarate content of 75 percent and a molecular weight of about 2,000. A casting was prepared from this polyester in the same manner as the casting of Example 4C. The casting is identified in Table 5 as "Example 19C."

TABLE 5

| Test | Casting, Example 4C (azelaic acid) | Casting, Example 19C (adipic acid) |
| --- | --- | --- |
| Electrical properties: | | |
| ASTM D-257: | | |
| Insulation resistance (ohms) | 8.3×10¹⁴ | 5.3×10¹⁴ |
| Volume resistivity (ohms-cm) | 6.0×10¹⁵ | 7.7×10¹⁵ |
| Surface resistivity (ohms) | 1.5×10¹⁵ | 1.9×10¹⁵ |
| ASTM D-150: | | |
| Dielectric constant, (60 Hertz) | 3.31 | 3.46 |
| Dissipation factor, (60 Hertz) | 0.004 | 0.004 |
| ASTM D-149: | | |
| Dielectric strength, short time (1)—(volts/mil) | 418 | 455 |
| Dielectric strength, short time (11) (kv.) | 60+ | 60+ |
| ASTM D-495: | | |
| Arc resistance (sec.) | 124 | 129 |
| Track resistance (min.) | 900+ | 900+ |
| Physical properties: | | |
| ASTM D-790: | | |
| Flexural strength, room temp. (p.s.i.) | 12,300 | 13,200 |
| Flexural modulus, room temp. (p.s.i.) | 332,000 | 359,000 |
| ASTM D-648-56: deflection temp. (° F.) | 152 | 159 |
| ASTM D-2583-67: Barcol hardness | 35 | 35 |

Additional test castings were made from the compositions of Examples 3–5 and 7–9 utilizing as the crosslinking agent tert-butylstyrene instead of vinyl toluene. The castings were prepared by utilizing the method used to prepare the castings of Examples 1C, 3C–9C and 11C–17C. Testing the properties of these castings showed that in general the cured compositions shrunk less when tert-butylstyrene was used as the crosslinking agent, but that the overall thermal stability of the cured resins was not quite so good as the castings made from the compositions that were crosslinked with vinyl toluene.

In addition, a filled glass mat was prepared from the unsaturated polyester of Example 19 as follows. Using a mechanical stirrer, 3,080 g. of a resinous composition containing 60 wt. percent of the polyester and 40 wt. percent of vinyl toluene and 2,640 g. of ASP 600 (aluminum silicate sold by Engelhard Industries) were mixed thoroughly. A second mixture comprised of 880 g. of the aforementioned resinous composition and 29.7 g. of 2,5-dimethylhexane-2,5-diper (2-ethyl) hexoate was then blended with the first mix and the resultant paste was applied by hand in a uniform manner to four plies of 1 ½ oz. chopped strand glass mat and four plies of glass surface mat (two on each surface). This sandwich-type composite was molded in a ⅛ × 20 ×14 inch cavity for 5 min. at 240° F. and 350 psi. After being subjected to a temperature of 230° C for 6 weeks, the cured product had a weight loss of only 4.3 percent; its dilelectric strength was 457 ST(1) volts/mil.

The unsaturated polyester of Example 19 was used also to prepare filament wound tubes in the following manner. A bath containing 60 wt. percent of the unsaturated polyester and 40 wt. percent of vinyl toluene was prepared. To the bath, 1 percent by wt. of benzoyl peroxide was added. Continuous glass strand roving was passed through the bath and wound at ambient temperature onto a steel mandrel having a 2 inch diameter using techniques and equipment which are well known in the art. The mandrel onto which the laminate had been wound was then rotated slowly for 2 hr. in an oven maintained at about 100° C. to gel the resin. Post-curing for 4 hr. at 150° C. followed. A filament-wound tube having nominal wall thickness of one-eighth inch was obtained; its glass content was about 20 percent. Percent weight losses of samples of the tubes after being exposed for 6 weeks to temperatures of 190° C, 210° C and 230° C were 1.3, 7.7 and 9.7 respectively.

We claim:

1. An unsaturated polyester consisting essentially of the esterification product of:
   a. about 15 to about 45 mole percent of an ethylenically unsaturated dicarboxylic acid;
   b. about 1 to about 25 mole percent of an aliphatic saturated dicarboxylic acid or a dimer or trimer of an ethylenically unsaturated aliphatic monocarboxylic acid having about 14 to about 22 carbon atoms;
   c. about 5 to about 20 mole percent of tetrahydrophthalic anhydride or endomethylene tetrahydrophthalic anhydride; and
   d. dihydric alcohol reactant selected from the group consisting of cyclohexanedimethanol and a mixture of about 20 to about 40 mole percent of neopentyl glycol and about 10 to about 30 mole percent of a second dihydric alcohol wherein the total mole percent of the acid reactants of (a), (b), and (c) and the dihydric alcohol reactant are about equal.

2. A polymerizable composition comprising:
   a. the unsaturated polyester of claim 1; and
   b. a vinyl monomer capable of crosslinking with said polyester to form a thermoset polymer.

3. A composition according to claim 2, wherein said vinyl monomer is vinyl toluene.

4. An unsaturated polyester consisting essentially of the esterification product of:
   A an acid reactant consisting essentially of:
   1. about 15 to about 45 mole percent of an unsaturate selected from the group consisting of maleic anhydride and fumaric acid;
   2. about 1 to about 25 mole percent of an aliphatic saturated dicarboxylic acid or a dimer or trimer of an ethylenically unsaturated aliphatic monocarboxylic acid having about 14 to about 22 carbon atoms;
   3. about 5 to about 20 mole percent of tetrahydrophthalic anhydride or endomethylene tetrahydrophthalic anhydride; and
   B. a dihydric alcohol selected from the group consisting of 1,4-cyclohexanedimethanol and a mixture of about 20 to about 40 mole percent of neopentyl glycol and about 10 to about 30 mole percent of a second dihydric alcohol;
   wherein the total mole percent of each of the acid and dihydric alcohol reactants are about equal.

5. An unsaturated polyester in accordance with claim 4 wherein said saturated dicarboxylic acid is selected from the group consisting of succinic, adipic, azelaic and sebacic acids and mixtures thereof.

6. An unsaturated polyester in accordance with claim 4 wherein reactant (A) (2) is said dimer acid and wherein said dimer acid is prepared from a $C_{18}$ fatty acid.

7. An unsaturated polyester resin in accordance with claim 4 wherein said dihydric alcohol reactant is a mixture of neopentyl glycol and 1,4-cyclohexanedimethanol.

8. A polymerizable composition comprising:

A. the unsaturated polyester of claim 4; and
B. a vinyl monomer capable of crosslinking with said polyester to form a thermoset polymer.

9. A composition according claim 8 wherein said vinyl monomer is vinyl toluene.

10. An unsaturated polyester consisting essentially of the esterification product of:
A. an acid reactant consisting essentially of:
   1. about 25 to about 40 mole percent of an unsaturate selected from the group consisting of maleic anhydride and fumaric acid;
   2. about 1 to about 12 mole percent of an aliphatic saturated dicarboxylic acid or a dimer or trimer of an ethylenically unsaturated aliphatic monocarboxylic acid having about 14 to about 22 carbon atoms;
   3. about 10 to about 15 mole percent of tetrahydrophthalic anhydride or endomethylene tetrahydrophthalic anhydride; and
B. a dihydric alcohol elected from the group consisting of 1,4-cyclohexanedimethanol and a mixture of about 25 to about 35 mole percent of neopentyl glycol and about 15 to about 25 mole percent of a second dihydric alcohol;
wherein the total mole percent of each of the acid and dihydric alcohol reactants are about equal.

11. An unsaturated polyester in accordance with claim 10 wherein said saturated dicarboxylic acid is selected from the group consisting of succinic, adipic, azelaic and sebacic acids and mixtures thereof.

12. An unsaturated polyester in accordance with claim 10 wherein reactant (A) (2) is said dimer acid and wherein said dimer acid is prepared from a $C_{18}$ fatty acid.

13. An unsaturated polyester in accordance with claim 10 wherein said dihydric alcohol reactant is a mixture of neopentyl glycol and 1,4-cyclohexanedimethanol.

14. A polymerizable composition comprising:
a. the unsaturated polyester of claim 10; and
b. a vinyl monomer capable of crosslinking with said polyester to form a thermoset polymer.

15. A composition according to claim 14, wherein said vinyl monomer is vinyl toluene.

16. A polymerizable composition comprising:
A. the unsaturated polyester of claim 11; and
B. a vinyl monomer capable of crosslinking with said polyester to form a thermoset polymer.

17. A composition according claim 16 wherein said vinyl monomer is vinyl toluene.

* * * * *

UNITED STATES PATENT OFFICE
CERTIFICATE OF CORRECTION

Patent No. 3,674,727              Dated July 4, 1972

Inventor(s) Frank Fekete and John S. McNally

It is certified that error appears in the above-identified patent and that said Letters Patent are hereby corrected as shown below:

IN THE DESCRIPTION

Column 1, line 18, "polymer" should read --polyester--.

Column 2, line 51, "533,999" should read --3,533,999--.

Column 10, line 55, "coasting" should read --casting--.

Column 11, Table 1, "5.8" to the left of "5.7" should be read in the column immediately to the right of "5.7".

Column 11, Table 2, last column, "5.6" second occurrence, should read --5.8--.

Column 13, Table 5, first entry of middle column, "8.3 1/4" should read --8.3X--.

IN THE CLAIMS

Claim 10, line 14, "elected" should read --selected--.

Claim 17, line 1, read --to-- after "according".

Signed and sealed this 9th day of January 1973.

(SEAL)
Attest:

EDWARD M. FLETCHER, JR.
Attesting Officer

ROBERT GOTTSCHALK
Commissioner of Patents